United States Patent
Li

(10) Patent No.: US 12,418,229 B2
(45) Date of Patent: Sep. 16, 2025

(54) SWITCHED RELUCTANCE MOTOR WITH UNEVEN DISTRIBUTION OF STATOR TEETH

(71) Applicant: SHENZHEN TATFOOK NEW ENERGY CO., LTD., Shenzhen (CN)

(72) Inventor: Tiecai Li, Shenzhen (CN)

(73) Assignee: SHENZHEN TATFOOK NEW ENERGY CO., LTD., Shenzhen (CN)

( * ) Notice: Subject to any disclaimer, the term of this patent is extended or adjusted under 35 U.S.C. 154(b) by 155 days.

(21) Appl. No.: 17/727,749

(22) Filed: Apr. 24, 2022

(65) Prior Publication Data
US 2022/0247290 A1 Aug. 4, 2022

Related U.S. Application Data

(63) Continuation of application No. PCT/CN2019/075227, filed on Feb. 15, 2019.

(51) Int. Cl.
*H02K 19/10* (2006.01)
*H02K 11/33* (2016.01)
*B60K 1/00* (2006.01)

(52) U.S. Cl.
CPC .......... *H02K 19/103* (2013.01); *H02K 11/33* (2016.01); *B60K 1/00* (2013.01); *H02K 2213/03* (2013.01)

(58) Field of Classification Search
CPC ........ H02K 19/103; H02K 19/10; H02K 1/24; H02K 1/246; H02K 11/33; H02K 2213/03; B60L 1/00
USPC ...................... 310/216.075, 216.111, 216.112
See application file for complete search history.

(56) References Cited

U.S. PATENT DOCUMENTS

| 6,236,132 | B1 | 5/2001 | Saito et al. | |
| 2008/0174195 | A1* | 7/2008 | Tupper | H02P 9/36 |
| | | | | 310/179 |
| 2010/0244786 | A1* | 9/2010 | Gruendl | H02K 7/025 |
| | | | | 310/90.5 |
| 2012/0139465 | A1 | 6/2012 | Harianto et al. | |

(Continued)

FOREIGN PATENT DOCUMENTS

| CN | 101359863 A | 2/2009 |
| CN | 101588113 A | 11/2009 |

(Continued)

OTHER PUBLICATIONS

Machine translation of CN109038994A. (Year: 2018).*

(Continued)

*Primary Examiner* — Michael Andrews

(57) ABSTRACT

A switched reluctance motor, an electric vehicle, and an electric device. The switched reluctance motor comprises a stator and a rotor. A plurality of rotor teeth are evenly distributed at a side of the rotor facing the stator. A plurality of stator teeth are unevenly distributed at a side of the stator facing the rotor, and the plurality of the stator teeth are divided into a plurality of phase groups arranged in sequence. An angle between centerlines of two stator teeth at a junction between two adjacent phase groups is different from an angle between centerlines of two adjacent rotor teeth, so that when the stator teeth in one of the plurality of phase groups are aligned with the rotor teeth, the stator teeth in the rest of the plurality of phase groups are staggered from the rotor teeth.

18 Claims, 6 Drawing Sheets

(56) References Cited

U.S. PATENT DOCUMENTS

2017/0264176 A1* 9/2017 Bernot .................. H02K 1/145
2018/0287473 A1* 10/2018 Bilgin ..................... H02K 3/28

FOREIGN PATENT DOCUMENTS

| | | | | |
|---|---|---|---|---|
| CN | 201910684 U | 7/2011 | | |
| CN | 102318167 A | 1/2012 | | |
| CN | 203289216 U | 11/2013 | | |
| CN | 204131245 U | 1/2015 | | |
| CN | 104821697 A | 8/2015 | | |
| CN | 105322677 A | 2/2016 | | |
| CN | 107171459 A | 9/2017 | | |
| CN | 108900053 A | 11/2018 | | |
| CN | 109038994 A | * 12/2018 | .............. | H02K 1/14 |
| CN | 109149800 A | 1/2019 | | |
| CN | 209823619 U | 12/2019 | | |
| DE | 19831165 A1 | 1/2000 | | |
| GB | 2499332 A | 8/2013 | | |
| WO | 9508425 A1 | 3/1995 | | |

OTHER PUBLICATIONS

International Search Report, International application No. PCT/CN2019/075227, mailed Apr. 29, 2019 (16 pages).
Chinese First Office Action, Chinese Application No. 201910117907.9, mailed Apr. 20, 2024 (14 pages).
Chinese Second Office Action, Chinese Application No. 201910117907.9, mailed Aug. 17, 2024 (11 pages).
Chinese Rejection decision, Chinese Application No. 201910117907.9, mailed Nov. 30, 2024 (10 pages).

* cited by examiner

SWITCHED RELUCTANCE MOTOR WITH UNEVEN DISTRIBUTION OF STATOR TEETH

CROSS REFERENCE

The present application is a continuation-application of International (PCT) Patent Application No. PCT/CN2019/075227 filed on Feb. 15, 2019, the entire contents of which are hereby incorporated by reference in their entireties.

TECHNICAL FIELD

The present disclosure relates to the field of motor, and in particular to a switched reluctance motor, an electric vehicle, and an electric device.

BACKGROUND

According to a principle of generating torque, conventional motors may be classified into two types. For a first type, a torque is generated according to a principle of electromagnetic action; for a second type, a torque is generated according to a principle of reluctance changing. For the first type of motors, each motor includes a stator and a rotor, a magnetic field of the stator may interact with a magnetic field of the rotor. The principle of the first type of motors is similar to a phenomenon that two magnets having the same polarity repel each other and having opposite polarities attract each other. For the second type of motors, motions are generated by changes of an air-gap reluctance between the stator and the rotor. A single-phase magnetic field may be generated when a winding installed on the stator is electrified. Because a magnetic flux always tends to close along a path with a minimum reluctance, that is, the minimum reluctance principle, therefore, when a centerline of the stator is misaligned with a centerline of the rotor, a reluctance force may act on the rotor, and the torque is generated, so as to drive the rotor to move towards a position with the minimum reluctance. A switched reluctance motor belongs to the second type of motors.

The stator and the rotor of a common switched reluctance motor are usually arranged with evenly-distributed tooth poles separately. Furthermore, the number of the tooth poles arranged on the stator is different from the number of the tooth poles arranged on the rotor, so that during an operation of the switched reluctance motor, a stator tooth is misaligned with a corresponding rotor tooth when the winding of the stator tooth of a phase is electrified, thereby driving the rotor to move.

SUMMARY OF THE DISCLOSURE

The present disclosure may provide switched reluctance motor, an electric vehicle, and an electric device, and a new design method of the switched reluctance motor is provided by the present disclosure.

According to a first aspect of the present disclosure, a switched reluctance motor may be provided and include: a rotor and a stator. A plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence. An angle between centerlines of two stator teeth at a junction between two adjacent phase groups is different from an angle between centerlines of two adjacent rotor teeth, so that in response to the stator teeth in one of the plurality of phase groups being aligned with the rotor teeth, the stator teeth in the rest of the plurality of phase groups are staggered from the rotor teeth.

According to a second aspect of the present disclosure, an electric vehicle is provided and includes a vehicle body and the switched reluctance motor. The switched reluctance motor is configured to drive the vehicle body to move and includes a rotor and a stator. A plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence. An angle between centerlines of two stator teeth at a junction between two adjacent phase groups is different from an angle between centerlines of two adjacent rotor teeth, so that in response to the stator teeth in one of the plurality of phase groups being aligned with the rotor teeth, the stator teeth in the rest of the plurality of phase groups are staggered from the rotor teeth.

According to a third aspect of the present disclosure, an electric device is provided and includes a power and the switched reluctance motor. The power is configured to power the switched reluctance motor. The switched reluctance motor includes a rotor and a stator. A plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence. An angle between centerlines of two stator teeth at a junction between two adjacent phase groups is different from an angle between centerlines of two adjacent rotor teeth, so that in response to the stator teeth in one of the plurality of phase groups being aligned with the rotor teeth, the stator teeth in the rest of the plurality of phase groups are staggered from the rotor teeth.

DETAILED DESCRIPTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those of ordinary skill in the art without creative work shall fall within the protection scope of this application.

Figure 1:
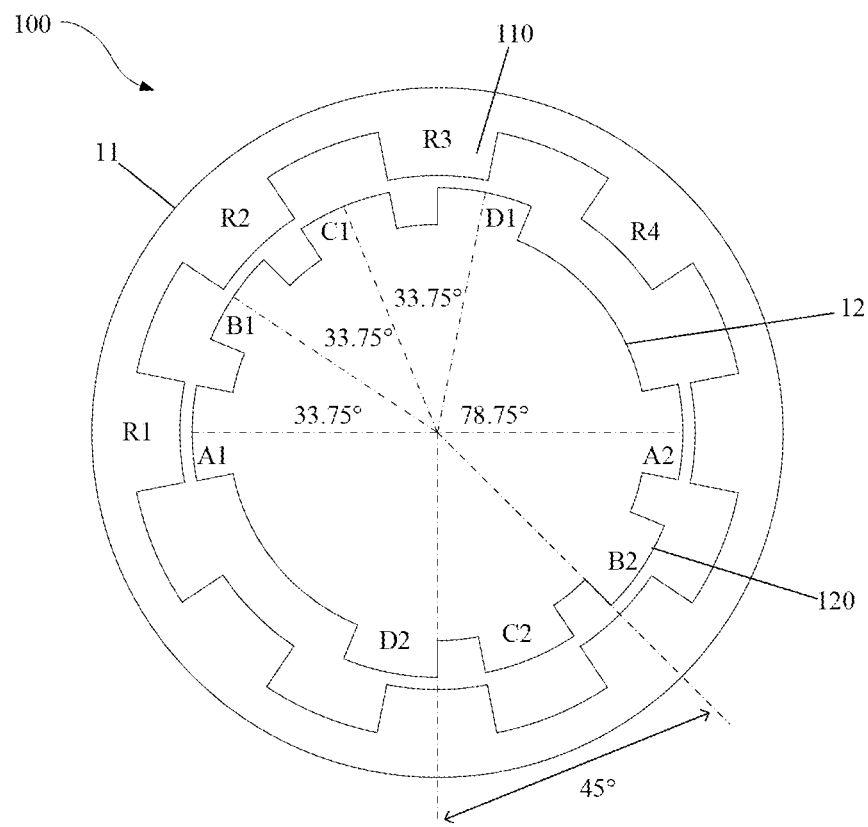
FIG. 1 is a structural schematic view of a switched reluctance motor in one motion state according to an embodiment of the present disclosure.
Figure 2:
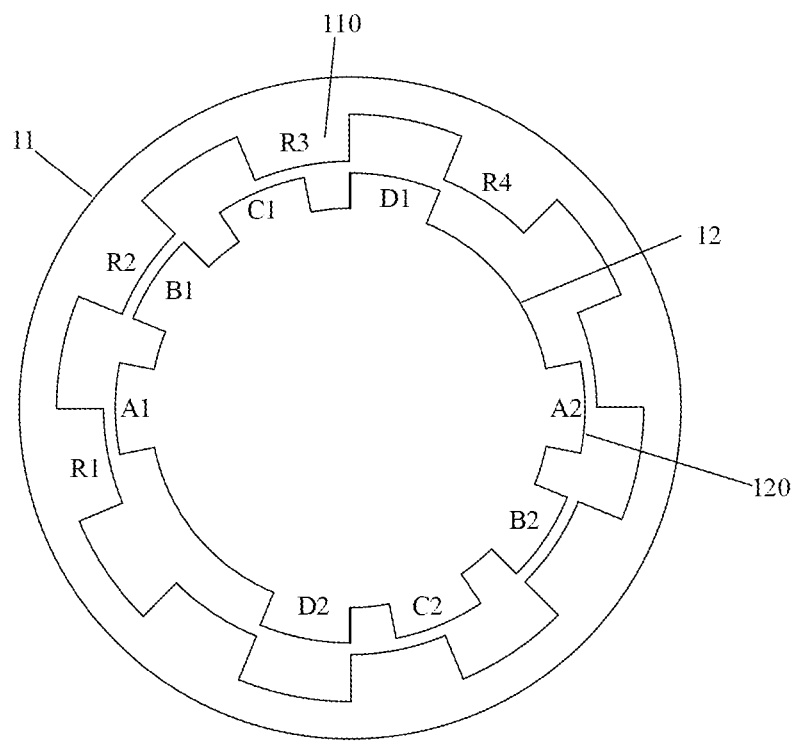
FIG. 2 is a structural schematic view of the switched reluctance motor in another motion state according to an embodiment of the present disclosure.
Figure 3:
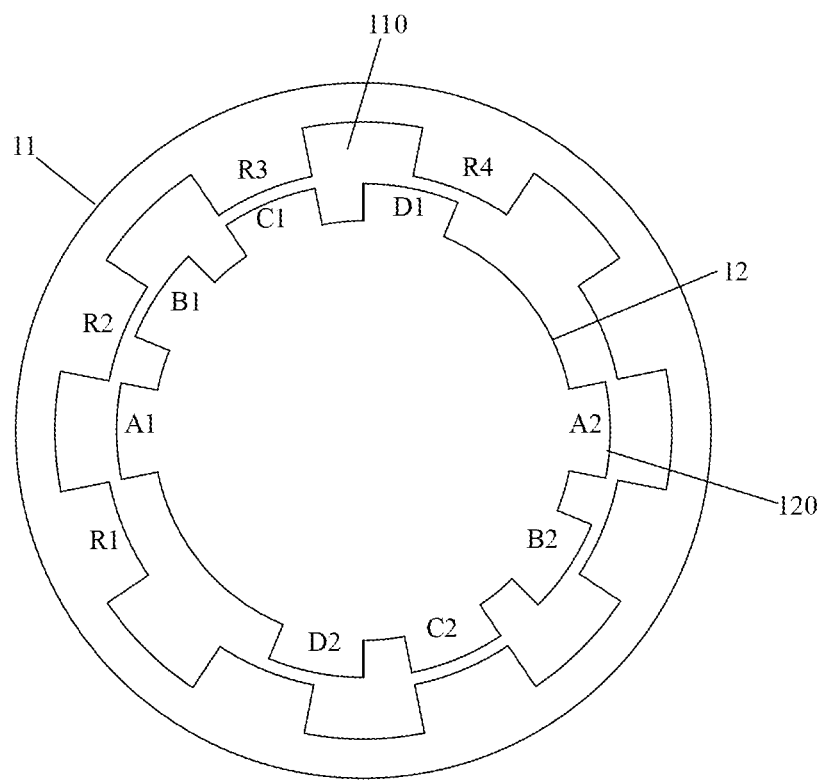
FIG. 3 is a structural schematic view of the switched reluctance motor in another motion state according to an embodiment of the present disclosure.
Figure 4:
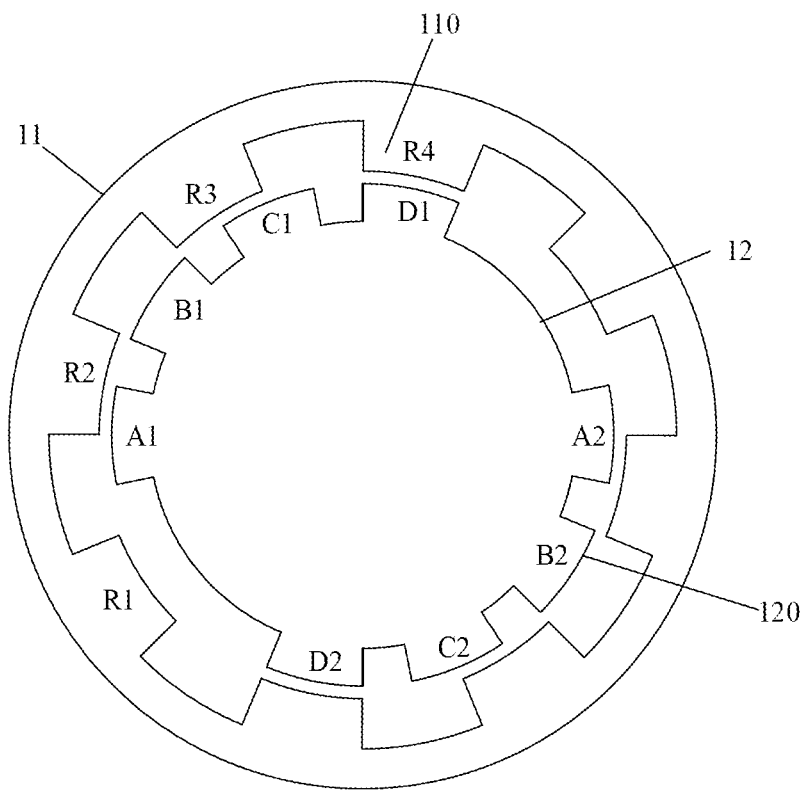
FIG. 4 is a structural schematic view of the switched reluctance motor in another motion state according to an embodiment of the present disclosure.

Referring to FIG. 1, FIG. 1 is a structural schematic views of a switched reluctance motor according to an embodiment of the present disclosure. The switched reluctance motor 100 includes a rotor 11 and a stator 12. The rotor 11 and the stator 12 may have a same central axis, that is, a central axis of the rotor 11 coincides with a central axis of the stator 12, and the rotor 11 is rotatably connected to the stator 12 by a rotational shaft.

A plurality of rotor teeth 110 are evenly distributed at a side of the rotor 11 facing the stator 12. As shown in FIG. 1, eight rotor teeth 110 are arranged on the rotor 11 of the switched reluctance motor. A plurality of stator teeth 120 are unevenly distributed at a side of the stator 12 facing the rotor 11, and the plurality of the stator teeth 120 are divided into a plurality of phase groups arranged in sequence. For example, in the embodiment shown in FIG. 1, the number of the stator teeth 120 is the same as the number of the rotor teeth 110, and both are eight. In addition, eight stator teeth 120 are divided into four phase groups A, B, C, D, and the four phase groups A, B, C, D are sequentially arranged. In other embodiments, it would be appreciated by those skilled in the art that the numbers of the rotor teeth 110 and the stator teeth 120 may be determined as required, and the number of the stator teeth 120 may be different from that of the rotor teeth 110.

Optionally, each of the phase groups (such as A~D) may include a plurality of subsets, and the plurality of subsets in the same phase group are spaced apart from each other by the subsets in the rest of the phase groups (that is, all other phase groups). Furthermore, each of the plurality of subsets includes at least one stator tooth 120 of the plurality of the stator teeth 120. For example, in this embodiment, each of the phase groups A to D includes two subsets, that is, the phase group A includes two subsets A1 and A2, the phase group B includes two subsets B1 and B2, the phase group C includes two subsets C1 and C2, and the phase group D includes two subsets D1 and D2. The subsets A1 and A2 are spaced apart from each other by the subsets B1, C1, and D1, or by the subsets B2, C2, and D2. Similarly, the subsets in other phase groups are spaced apart from each other in the same ways. In some embodiments, the subsets in each of the phase groups only include one stator tooth 120. Therefore, for convenience of description, the subset A1, A2, B1, C1, C2, D1, or D2 is used directly to indicate the stator tooth 120 in the corresponding subset. In other embodiments, it would be appreciated that the plurality of subsets in each of the plurality of phase groups may include at least two stator teeth of the plurality of the stator teeth, and the number of the subsets in each of the phase groups is not limited to two, for example, the number of the subsets in one phase group may also be three, four, five, six, and so on.

An angle between centerlines of two stator teeth 120 at a junction between two adjacent phase groups is different from an angle between centerlines of two adjacent rotor teeth 110. Taking a structure shown in FIG. 1 as an example, the eight rotor teeth 110 are evenly distributed on the rotor 11, so that it may be calculated that the angle between the centerlines of the two adjacent rotor teeth 110 is 360°/8=45 degrees. However, in some embodiments, an angle between centerlines of the stator teeth 120 at a junction between the phase group A and the phase group B is 33.75 degrees (that is to say, the angle between centerlines of the stator teeth 120 in the phase A1 and the stator teeth 120 in the phase B1, or the stator teeth 120 in the phase A2 and the stator teeth 120 in the phase B2 is 33.75 degrees), and the angle between the centerlines of the stator teeth 120 at the junction between the phase group A and the phase group B is different from the angle between centerlines of the two adjacent rotor teeth 110. Similarly, an angle between centerlines of the stator teeth 120 at a junction between the phase group B and the phase group C is 33.75 degrees (that is to say, the angle between centerlines of the stator teeth 120 in the phase B1 and the stator teeth 120 in the phase C1, or the stator teeth 120 in the phase B2 and the stator teeth 120 in the phase C2 is 33.75 degrees), and the angle between centerlines of the stator teeth 120 at the junction between the phase group B and the phase group C is also different from the angle between centerlines of the two adjacent rotor teeth 110. An angle between centerlines of the stator teeth 120 at a junction between the phase group C and the phase group D is 33.75 degrees (that is to say, the angle between centerlines of the stator teeth 120 in the phase C1 and the stator teeth 120 in the phase D1, or the stator teeth 120 in the phase C2 and the stator teeth 120 in the phase D2 is 33.75 degrees), and the angle between the centerlines of the stator teeth 120 at the junction between the phase group C and the phase group D is also different from the angle between centerlines of the two adjacent rotor teeth 110. An angle between centerlines of the stator teeth 120 at a junction between the phase group D and the phase group A is 78.75 degrees (that is to say, the angle between centerlines of the stator teeth 120 in the phase D1 and the stator teeth 120 in the phase A2, or the stator teeth 120 in the phase D2 and the stator teeth 120 in the phase A1 is 78.75 degrees), and the angle between centerlines of the stator teeth 120 at the junction between the phase group D and the phase group A is also different from the angle between centerlines of the two adjacent rotor teeth 110. Therefore, when the stator teeth 120 in any of the phase groups A~D is aligned with the rotor teeth 110, the stator teeth 120 in all other phase groups are staggered from the rotor teeth 110. In some embodiments, it would be appreciated that the angle between the centerlines of the stator teeth 120 at the junction between the phase group A and the phase group B, the angle between the centerlines of the stator teeth 120 at the junction between the phase group B and the phase group C, and the angle between the centerlines of the stator teeth 120 at the junction between the phase group C and the phase group D may also be different from each other, which is not specifically limited herein.

By unevenly distributing the stator teeth 120 on the stator 12, and making the angle between the centerlines of the stator teeth 120 at the junction between two adjacent phase groups be different from the angle between the centerlines of two adjacent rotor teeth 110, it is possible that when the stator teeth 120 in any one of the phase groups A~D is aligned with the rotor teeth 110, the stator teeth 120 in all other phase groups among the phases groups A~D are staggered from the rotor teeth 110. In this way, it is possible to drive the rotor 11 to rotate relatively to the stator 12 by sequentially powering windings corresponding to the stator teeth 120 of each of the plurality of phase groups. Therefore, a new design method of the switched reluctance motor is provided in some embodiments of the present disclosure.

In some embodiments, the subsets in each of the plurality of phase groups of the stator teeth 120 only include one stator tooth 120. In this case, the number of the stator teeth 120 is the same as the number of the rotor teeth 110. In other embodiments, the subsets in each of the plurality of phase groups of the stator teeth 120 include a plurality of the stator teeth 120. In this case, the number of the stator teeth 120 may be different from that of the number of the rotor teeth 110, which will be described in details as follow.

In some embodiments, the number of the phase groups of the stator teeth 120 is N, and the N phase groups are arranged in sequence. An angle between centerlines of the stator teeth 120 at a junction between one group of the phase groups and another adjacent group of the phase groups is (N−1)/N times greater than the angle between the centerlines of the rotor teeth 110, while an angle between centerlines of the stator teeth 120 at a junction between every two of the rest of the adjacent phase groups is 1/N times less than the angle between the centerlines of the rotor teeth 110. For example, in the embodiment shown in FIG. 1, the number of the phase groups of the stator teeth 120 is four, and four phase groups (each group includes phase groups A~D) are arranged in sequence. Specifically, the angle between the centerlines of the stator teeth 120 at the junction between the phase group A and the phase group D is 45+45*¾=78.75 degrees, while the angle between the centerlines of the stator teeth 120 at the junction between other adjacent phase groups is 45−45*¼=33.75 degrees. In this way, when any one of the rotor teeth 110 is aligned with the stator tooth 120 of one phase group, an angle between the rotor tooth 110 that is closest to the stator tooth 120 of a next phase along a rotation direction of the rotor 11 and the stator tooth 120 of the next phase group is equal to a fixed value. The embodiments will be described hereinafter in conjunction with FIGS. 1-4.

Referring to FIG. 1, when a rotor tooth R1 is aligned with a stator tooth A1 of the phase group A, an angle between centerlines of a stator tooth B1 of the phase group B (the next phase group of the phase group A) and a rotor tooth R2 is equal to the angle between the centerlines of the rotor teeth 110 minus the angle between the centerlines of the stator teeth 120 at the junction between the phase group A and the phase group B. That is to say, the angle is 45−33.75=11.25 degrees. At this time, power is stopped supplying to the windings of the stator teeth 120 of the phase group A, while the windings of the stator teeth 120 of the phase group B is powered, the stator tooth B1 attracts the rotor tooth R2 to move in a direction aligned with the stator tooth B1 (that is, the direction is an anticlockwise direction as shown in FIG. 1) according to the minimum reluctance principle, and the rotor tooth R2 reaches a position shown in FIG. 2. In the embodiment shown in FIG. 2, the rotor tooth R2 is aligned with the stator tooth B1 of the phase group B, an angle between centerlines of a stator tooth C1 of the phase group C and a rotor tooth R3 may be calculated by a similar method, and a value of the angle between the centerlines of the stator tooth C1 of the phase group C and the rotor tooth R3 is also equal to 11.25 degrees. At this time, power is stopped supplying to the windings of the stator teeth 120 of the phase group B, while the windings of the stator teeth 120 of the phase group C is powered, the stator tooth C1 attracts the rotor tooth R3 to move in the anticlockwise direction, and the rotor tooth R3 reaches a position shown in FIG. 3. In the embodiment shown in FIG. 3, the rotor tooth R3 is aligned with the stator tooth C1, an angle between centerlines of a stator tooth D1 of the phase group D and a rotor tooth R4 may also be calculated by the similar method, and the value of the angle between the centerlines of the stator tooth D1 of the phase group D and the rotor tooth R4 is also equal to 11.25 degrees. At this time, power is stopped supplying to the windings of the stator teeth 120 of the phase group C, while the windings of the stator teeth 120 of the phase group D is powered, the stator tooth D1 attracts the rotor tooth R4 to move in the anticlockwise direction, and the rotor tooth R4 reaches a position shown in FIG. 4. In the embodiment shown in FIG. 4, the rotor tooth R4 is aligned with the stator tooth D1, after the rotor tooth R2 is rotated in the anticlockwise direction, an angle between centerlines of the stator tooth A1 and the rotor tooth R2 is also equal to 11.25 degrees. At this time, power is stopped supplying to the windings of the stator teeth 120 of the phase group D while the windings of the stator teeth 120 of the phase group A is repowered, and the stator tooth A1 attracts the rotor tooth R2 to move in the anticlockwise direction. Therefore, it is possible to drive the rotor 11 to rotate relative to the stator 12 by sequentially powering the windings of the stator teeth 120 of each of the phase groups periodically. It can be seen that, a rotation direction of the rotor teeth 110 is opposite to a direction of a power-on timing. Thus, the rotation direction of the rotor teeth 110 may be switched by changing the power-on timing.

In some embodiments, the angle between the centerlines of the stator teeth 120 at a junction between one phase group and another phase group on the stator 12 is set to be (N−1)/N times greater than the angle between the centerlines of the adjacent rotor teeth 110, while the angle between the centerlines of the stator teeth 120 at the junction between other adjacent phase groups is set to be UN times less than the angle between the centerlines of the adjacent rotor teeth 110, so that a change of an electromagnetic torque of the motor is stable during the rotation of the rotor 11, thereby improving a performance of the switched reluctance motor 100.

Figure 5:
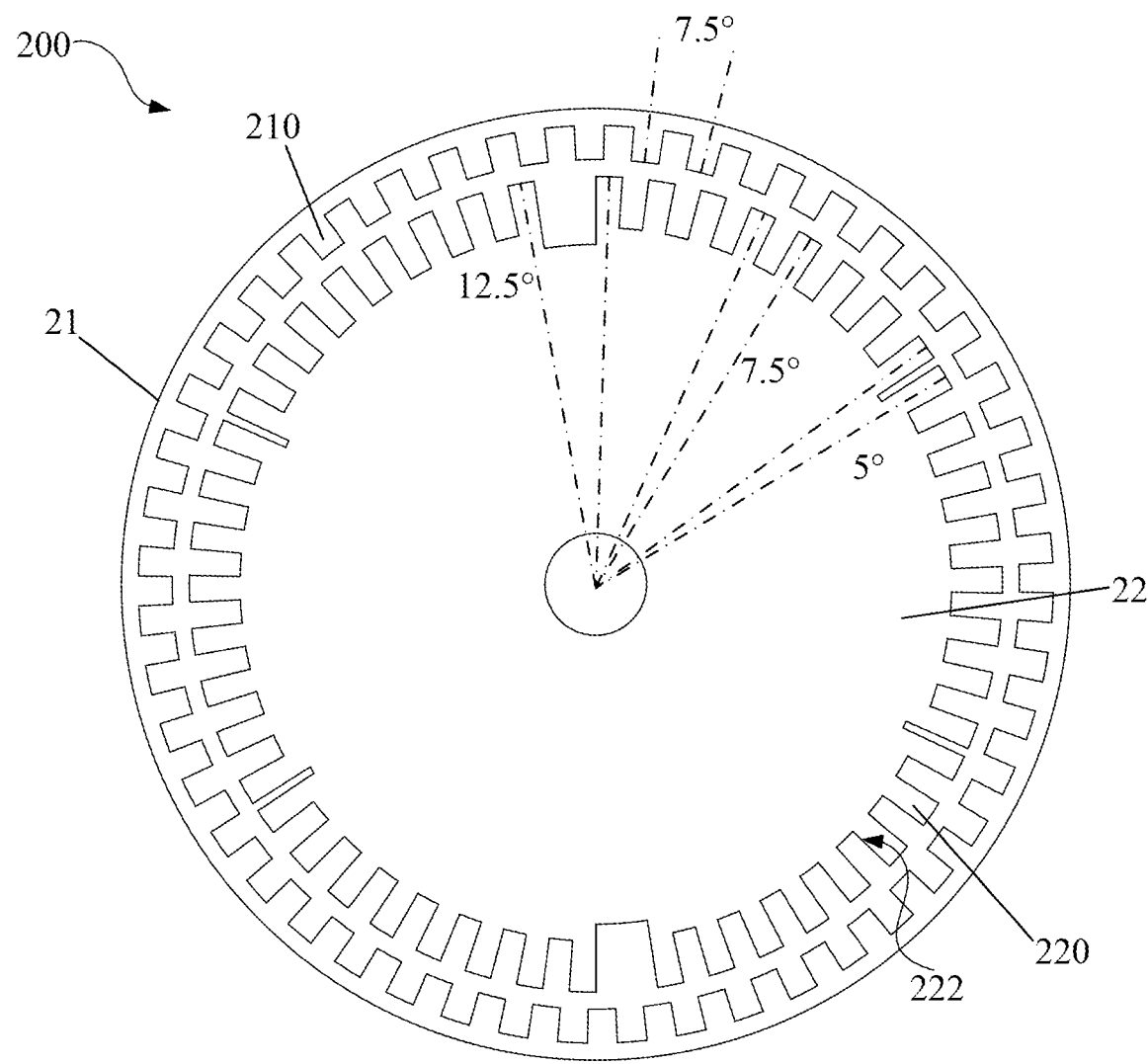
FIG. 5 is a structural schematic view of the switched reluctance motor according to an embodiment of the present disclosure.

Referring to FIGS. 5-8, FIG. 5 is a structural schematic view of the switched reluctance motor according to an embodiment of the present disclosure. Referring to FIG. 5, a switched reluctance motor 200 includes a stator 21 and a rotor 22.

A plurality of rotor teeth 210 are evenly distributed at a side of the rotor 21 facing the stator 22. A plurality of stator teeth 220 are unevenly distributed at a side of the stator 22 facing the rotor 21, and the stator teeth 220 are divided into three phase groups A, B, and C arranged in sequence. Each of the phase groups includes two subsets disposed opposite to each other, that is, the phase group A includes the two subsets A1 and A2, the phase group B includes the two subsets B1 and B2, and the phase group C includes the two subsets C1 and C2.

In some embodiments, the subset A1, A2, B1, B2, C1, or C2 of each of the phase groups includes the plurality of the stator teeth 220. In some embodiments, an angle between centerlines of the two adjacent stator teeth 220 in each of the plurality of subsets is the same as an angle between the centerlines of the two adjacent rotor teeth 210. For example, in the embodiments shown in FIGS. 5-8, the number of the stator teeth 220 in each of the subsets is eight, so a total number of the stator teeth 220 in all the subsets is 3*2*8=48. The number of the rotor teeth 210 is the same as the number of the stator teeth 220, and the number of the rotor teeth 210 is also 48. Thus, the angle between the centerlines of the adjacent rotor teeth 210 is 360/48=7.5 degrees. Correspondingly, the angle between the centerlines of the adjacent stator teeth 220 in the subsets of each of the phase groups is also 7.5 degrees. In this way, when a stator tooth 220 in a specific phase group is aligned with a rotor tooth 210, all of the stator teeth 220 in the same phase group are aligned with the corresponding rotor teeth 210. It would be appreciated that the number of the stator teeth 220 may be slightly less than the number of the rotor teeth 210 when each of the subsets includes the plurality of the stator teeth 220. For example, one stator tooth 220 in any of the subsets shown in FIG. 5 may be removed, and a position of other stator teeth 220 may be kept unchanged. In this case, it will have some impact on a torque during the rotation of the rotor 21, but the impact may be ignored when the number of the stator teeth 220 is great enough. Other functional components may be arranged in the position of the removed stator tooth 220, which will not be limited herein.

Figure 6:
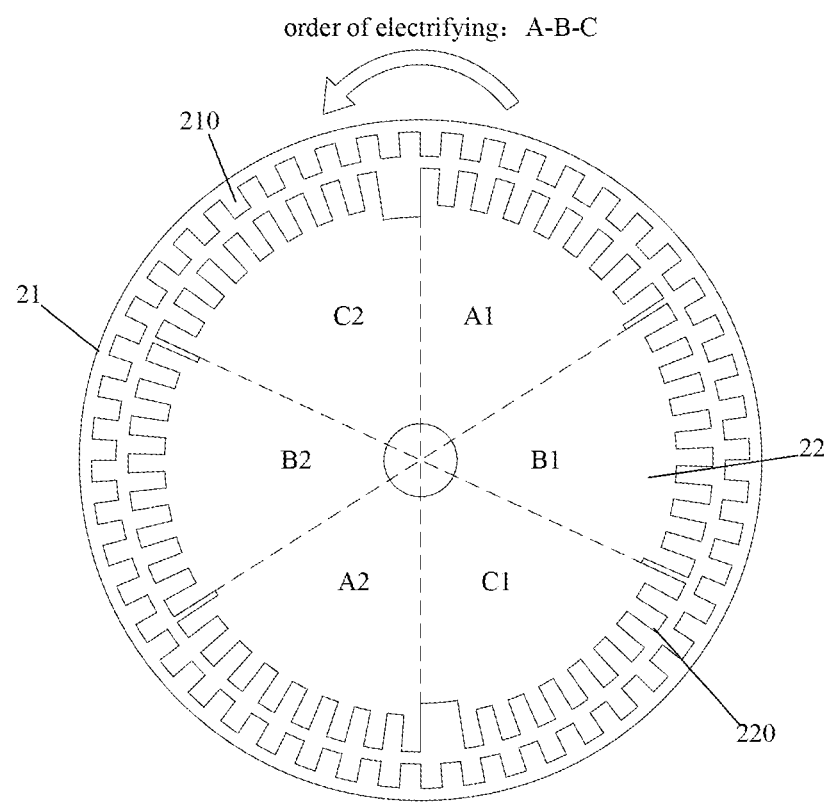
FIG. 6 is one motion mode of the switched reluctance motor as shown in FIG. 5.

Referring to FIG. 5 and FIG. 6, in the embodiments, the stator 22 is arranged with three-phase stator teeth 220. In addition, angles between centerlines of the stator teeth 220 at junctions of every two adjacent phase groups of the three phases satisfy formulas shown in the following.

$$P1 = P2 = P0 - P0 \cdot \frac{1}{3}$$
$$P3 = P0 + P0 \cdot \frac{2}{3}$$

P0 may indicate an angle between the centerlines of the two adjacent rotor teeth 210. P1 may indicate an angle between centerlines of the stator teeth 220 at a junction between the phase group A and the phase group B (such as a junction between the phase A1 and the phase B1, or between the phase A2 and the phase B2). P2 may indicate an angle between centerlines of the stator teeth 220 at a junction between the phase group B and the phase group C (such as a junction between the phase B1 and the phase C1, or between the phase B2 and the phase C2). P3 may indicate an angle between centerlines of the stator teeth 220 at a junction between the phase group C and the phase group A (such as a junction between the phase C1 and the phase A2, or between the phase C2 and the phase A1). According to the formulas mentioned as the above, P1=P2=7.5−7.5*⅓=5°, while P3=7.5+7.5*⅔=12.5°. In this way, a change of an electromagnetic torque of the motor is stable during the rotation of the rotor 21, thereby improving a performance of the switched reluctance motor 200.

The switched reluctance motor 200 according to some embodiments of the present disclosure further includes windings 222 on the stator teeth 220 in each of the phase groups. Furthermore, turns of the windings 222 of the stator teeth 220 at the junction between the two adjacent phase groups may be fewer than turns of the windings 222 of other stator teeth 220, so that it is impossible to avoid to generate a magnetic saturation at this position.

It is not shown in the figures, but it would be appreciated by those skilled in the art that the switched reluctance motor 200 according to some embodiments of the present disclosure further includes driving circuits (not shown). The driving circuits are configured to provide driving currents for the windings of the stator teeth 220 of each of the plurality of phase groups in a normal order or a reverse order, so that a magnetic circuit is formed between the windings 222. In the embodiments shown in FIG. 5 and FIG. 6, if the windings of the stator teeth 220 of the phases are powered periodically in an order of A-B-C-A, the rotor 21 will rotate in an anticlockwise direction as shown in the figures. If the windings of the stator teeth 220 of the phases is powered periodically in an order of C-B-A-C, the rotor 21 will rotate in an opposite direction, that is, the clockwise direction.

Figure 7:
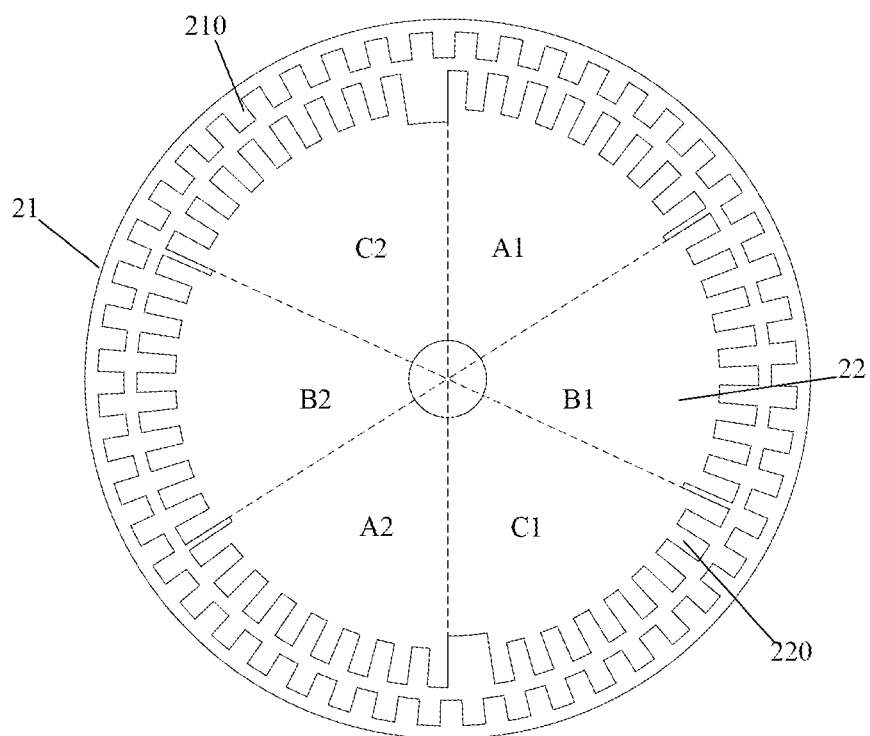
FIG. 7 is another motion mode of the switched reluctance motor as shown in FIG. 5.
Figure 8:
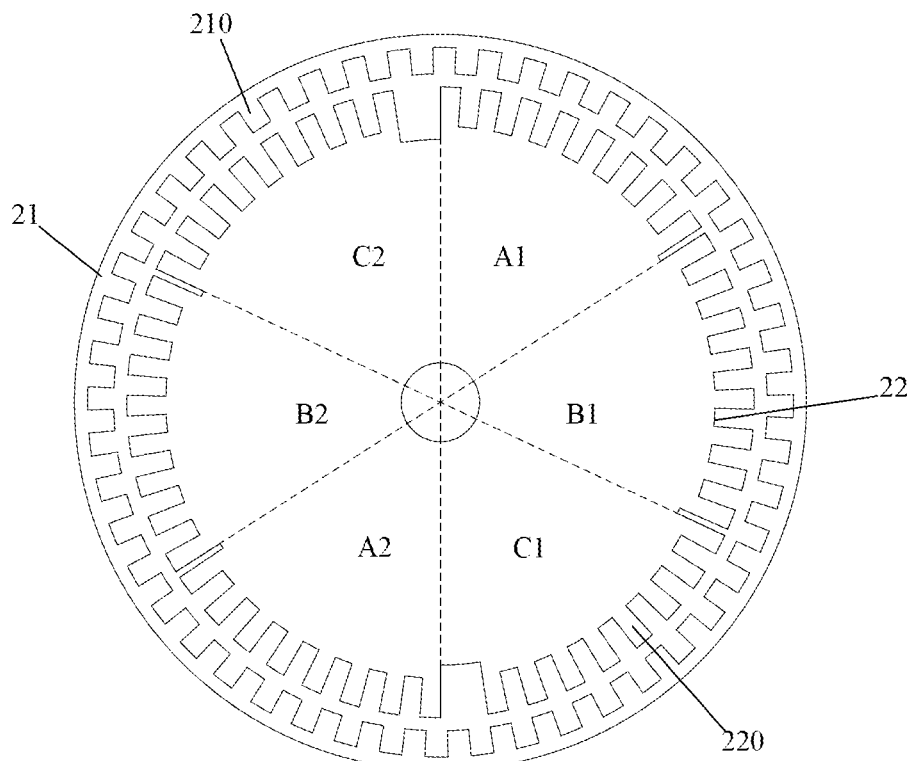
FIG. 8 is another motion mode of the switched reluctance motor as shown in FIG. 5.

FIGS. 6-8 are motion processes of the switched reluctance motor of the embodiments. When the windings 222 on the stator teeth 220 of the phase group A (including the phase A1 and phase A2) are electrified, it is possible to drive the rotor 21 to rotate, thereby making a part of the rotor teeth 210 of the rotor 21 be aligned with the stator teeth 220 of the phase group A, and reach a position shown in FIG. 6. At this time, power is stopped supplying to the phase group A, while the windings 222 on the stator teeth 220 of the phase group B (including the phase B1 and phase 132) are powered, and it is possible to drive the rotor 21 to continue to rotate, thereby making the part of the rotor teeth 210 of the rotor 21 be aligned with the stator teeth 220 of the phase group B, and reach a position shown in FIG. 7. At this time, power is stopped supplying to the phase group B, while the windings 222 of the stator teeth 220 of the phase group C (including the phase C1 and phase C2) are powered, and it is possible to drive the rotor 21 to continue to rotate, thereby making the part of the rotor teeth 210 of the rotor 21 be aligned with the stator teeth 220 of the phase group C, and reach a position shown in FIG. 9. At this time, power is stopped supplying to the phase group C, while the windings of the stator teeth 220 of the phase group A is repowered, and it is possible to drive the rotor 21 to continue to rotate, thereby making the part of the rotor teeth 210 of the rotor 21 be aligned with the stator teeth 220 of the phase group A, and reach another position shown in FIG. 6. In this way, a rotational motion of the rotor 21 may be achieved. It would be noted that a next phase may be switched to be powered when the rotor teeth 210 are not fully aligned with the corresponding stator teeth 220 during an actual operation, which is not limited herein.

The switched reluctance motor of the present disclosure causes a small torque ripple and has a stable operation, and may provide a good driving capability. It would be appreciated that the number of the phases of the rotor teeth 220 may be different in other embodiments. For example, the number of the phases may be four or six. Furthermore, the number of the subsets in one phase group may also be different, for example, the one phase group may include three subsets, four subsets, or the like, or may include only one subset, as long as the magnetic circuit may be achieved in the phase group.

In addition, in the embodiments shown in figures, the rotor 11 or 21 is arranged outside the stator 12 or 22, that is, the switched reluctance motor is an external rotor motor. However, the present disclosure may also be applied to an inner rotor motor, that is, the rotor 11 or 21 is arranged inside the stator 12 or 22, which is also included in the scope of protection of the present disclosure.

Figure 9:
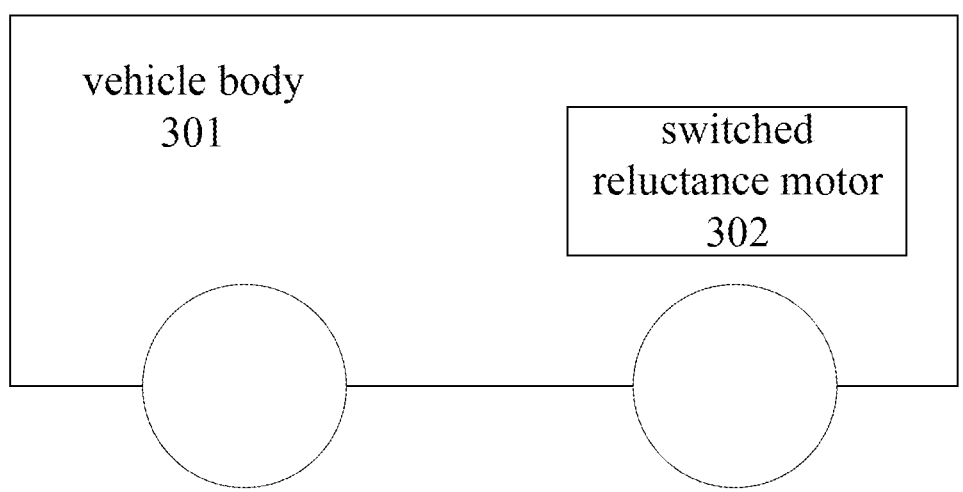
FIG. 9 is a structural schematic view of an electric vehicle according to an embodiment of the present disclosure.

Referring to FIG. 9, an electric vehicle is further provided by the present disclosure. The electric vehicle 300 may be a vehicle arranged with one wheel, two wheels, three wheels, or four wheels. For example, the electric vehicle 300 may be a four-wheel electric vehicle. The electric vehicle 300 includes a vehicle body 301 and a switched reluctance motor 302, and a structure of the switched reluctance motor 302 may be similar to the structure of the switched reluctance motor in any of the embodiments mentioned as the above. Furthermore, the switched reluctance motor 302 is configured to drive the electric vehicle 300 to rotate, thereby driving the vehicle body 301 to move.

Figure 10:
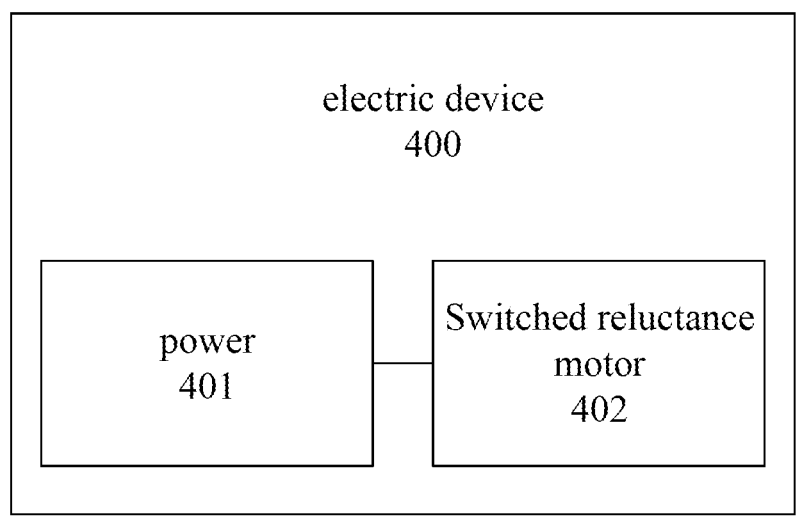
FIG. 10 is a structural schematic view of an electric device according to an embodiment of the present disclosure.

Referring to FIG. 10, an electric device is further provided by the present disclosure. The electric device 400 may include a power 401 and a switched reluctance motor 402. Furthermore, the power 401 is configured to power driving circuits of the switched reluctance motor 402, thereby driving the rotor of the switched reluctance motor 402 to rotate. A structure of the switched reluctance motor 402 may be similar to the structure of the switched reluctance motor in any of the embodiments mentioned as the above. The electric device 400 may be any device that needs rotational driving force, such as a machine tool, a textile machine, a water pump, a fan, a compressor, a vehicle, a crane, a washing machine, etc.

The above are only embodiments of the present disclosure and are not intended to limit the scope of the present disclosure. Any equivalent structural changes made under the concept of the present disclosure, using the contents of the specification of the present disclosure and the accompanying drawings, or applied directly/indirectly in other related fields of technology are included in the scope of protection of the present disclosure.

What is claimed is:

1. A switched reluctance motor, comprising a rotor and a stator;
    wherein a plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence; all stator teeth of one phase group of the plurality of phase groups are supplied with power at the same time; the plurality of phase groups are supplied with power at different time periods with each other;
    an angle between centerlines of two stator teeth at a junction between two adjacent phase groups is different from an angle between centerlines of two adjacent rotor teeth, so that in response to the stator teeth in one of the plurality of phase groups being aligned with the rotor teeth, and the stator teeth in the rest of the plurality of phase groups are staggered from the rotor teeth;
    wherein the number of the phase groups is N, and N phase groups comprises a first phase group, a second phase group, and a rest phase group; the rest phase group is disposed between the first phase group and the second phase group;
    an angle between centerlines of the stator teeth at a junction between the first phase group and second phase group adjacent to the first phase group is (N−1)/N times greater than the angle between the centerlines of the rotor teeth, while an angle between centerlines of the stator teeth at a junction between of the first phase group and the rest phase group adjacent to the first phase group is 1/N times less than the angle between the centerlines of the rotor teeth, an angle between centerlines of the stator teeth at a junction between of the rest phase group and the second phase group adjacent to the rest phase group is 1/N times less than the angle between the centerlines of the rotor teeth.

2. The switched reluctance motor according to claim 1, wherein the number of the stator teeth is the same as the number of the rotor teeth.

3. The switched reluctance motor according to claim 1, wherein each of the plurality of phase groups comprises a plurality of subsets, the plurality of subsets in the same phase group are spaced apart from each other by the subsets in the rest of the phase groups, and each of the plurality of subsets comprises at least one stator tooth of the plurality of the stator teeth.

4. The switched reluctance motor according to claim 3, wherein the plurality of subsets in each of the plurality of phase groups comprise at least two stator teeth of the plurality of the stator teeth, and an angle between centerlines of the two adjacent stator teeth in each of the plurality of subsets is the same as an angle between the centerlines of the two adjacent rotor teeth.

5. The switched reluctance motor according to claim 1, wherein the number of the phase groups is three, and angles between centerlines of the stator teeth of at junctions of every two adjacent phase groups of the three phase groups satisfy formulas shown as follows:

$$P1 = P2 = P0 - P0 \cdot \frac{1}{3}$$

$$P3 = P0 + P0 \cdot \frac{2}{3}$$

wherein P0 represents an angle between the centerlines of the two adjacent rotor teeth, P1 represents an angle between centerlines of the stator teeth at a junction between a first phase group and a second phase group, P2 represents an angle between centerlines of the stator teeth at a junction between the second phase group and a third phase group, and P3 represents an angle between centerlines of the stator teeth at a junction between the third phase group and the first phase group.

6. The switched reluctance motor according to claim 1, wherein the stator comprises windings on the stator teeth in each of the plurality of phase groups, and turns of the windings of the stator teeth at the junction between the two adjacent phase groups are fewer than turns of the windings of other stator teeth.

7. The switched reluctance motor according to claim 6, further comprising driving circuits, wherein the driving circuits are configured to provide driving currents for the windings of the stator teeth of each of the plurality of phase groups successively.

8. The switched reluctance motor according to claim 1, wherein the switched reluctance motor is an external rotor motor, and the stator is arranged inside the rotor;
    or, the switched reluctance motor is an inner rotor motor, and the stator is arranged outside the rotor.

9. An electric vehicle, comprising:
    a vehicle body; and
    a switched reluctance motor, configured to drive the vehicle body to move and comprising a rotor and a stator;
    wherein a plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence; all stator teeth of one phase group of the plurality of phase groups are supplied with power at the same time; the plurality of phase groups are supplied with power at different time periods with each other;
    an angle between centerlines of two stator teeth at a junction between two adjacent phase groups is different from an angle between centerlines of two adjacent rotor teeth, so that in response to the stator teeth in one of the plurality of phase groups being aligned with the rotor teeth, the stator teeth in the rest of the plurality of phase groups are staggered from the rotor teeth;
    wherein the number of the phase groups is N, and N phase groups comprises a first phase group, a second phase group, and a rest phase group; the rest phase group is disposed between the first phase group and the second phase group;
    an angle between centerlines of the stator teeth at a junction between the first phase group and second phase group adjacent to the first phase group is (N−1)/N times greater than the angle between the centerlines of the rotor teeth, while an angle between centerlines of the stator teeth at a junction between of the first phase group and the rest phase group adjacent to the first phase group is 1/N times less than the angle between the centerlines of the rotor teeth, an angle between centerlines of the stator teeth at a junction between of the rest phase group and the second phase group adjacent to the rest phase group is 1/N times less than the angle between the centerlines of the rotor teeth.

10. The electric vehicle according to claim 9, wherein the number of the stator teeth is the same as the number of the rotor teeth.

11. The electric vehicle according to claim 9, wherein each of the plurality of phase groups comprises a plurality of subsets, the plurality of subsets in the same phase group are spaced apart from each other by the subsets in the rest of the phase groups, and each of the plurality of subsets comprises at least one stator tooth of the plurality of the stator teeth.

12. The electric vehicle according to claim 11, wherein the plurality of subsets in each of the plurality of phase groups comprise at least two stator teeth of the plurality of the stator teeth, and an angle between centerlines of the two adjacent stator teeth in each of the plurality of subsets is the same as an angle between the centerlines of the two adjacent rotor teeth.

13. The electric vehicle according to claim 9, wherein the number of the phase groups is three, and angles between centerlines of the stator teeth of at junctions of every two adjacent phase groups of the three phase groups satisfy formulas shown as follows:

$P1=P2=P0-P0\cdot\frac{1}{3}$ $P3=P0+P0\cdot\frac{2}{3}$ wherein P0 represents an angle between the centerlines of the two adjacent rotor teeth, P1 represents an angle between centerlines of the stator teeth at a junction between a first phase group and a second phase group, P2 represents an angle between centerlines of the stator teeth at a junction between the second phase group and a third phase group, and P3 represents an angle between centerlines of the stator teeth at a junction between the third phase group and the first phase group.

14. The electric vehicle according to claim 9, wherein the stator comprises windings on the stator teeth in each of the plurality of phase groups, and turns of the windings of the stator teeth at the junction between the two adjacent phase groups is fewer than turns of the windings of other stator teeth.

15. The electric vehicle according to claim 14, further comprising driving circuits, wherein the driving circuits are configured to provide driving current for the windings of the stator teeth of each of the plurality of phase groups successively.

16. The electric vehicle according to claim 9, wherein the switched reluctance motor is an external rotor motor, and the stator is arranged inside the rotor, or, the switched reluctance motor is an inner rotor motor, and the stator is arranged outside the rotor.

17. An electric device, comprising: a power source and a switched reluctance motor;

wherein the power source is configured to power source the switched reluctance motor, and the switched reluctance motor comprises a rotor and a stator;

a plurality of rotor teeth are evenly distributed at a side of the rotor facing the stator, a plurality of stator teeth are unevenly distributed at a side of the stator facing the rotor, and the plurality of the stator teeth are divided into a plurality of phase groups arranged in sequence; all stator teeth of one phase group of the plurality of phase groups are supplied with power at the same time; the plurality of phase groups are supplied with power at different time periods with each other;

an angle between centerlines of two stator teeth at a junction between two adjacent phase groups is different from an angle between centerlines of two adjacent rotor teeth, so that in response to the stator teeth in one of the plurality of phase groups being aligned with the rotor teeth, the stator teeth in the rest of the plurality of phase groups are staggered from the rotor teeth;

wherein the number of the phase groups is N, and N phase groups comprises a first phase group, a second phase group, and a rest phase group; the rest phase group is disposed between the first phase group and the second phase group;

an angle between centerlines of the stator teeth at a junction between the first phase group and second phase group adjacent to the first phase group is (N−1)/N times greater than the angle between the centerlines of the rotor teeth, while an angle between centerlines of the stator teeth at a junction between of the first phase group and the rest phase group adjacent to the first phase group is 1/N times less than the angle between the centerlines of the rotor teeth, an angle between centerlines of the stator teeth at a junction between of the rest phase group and the second phase group adjacent to the rest phase group is 1/N times less than the angle between the centerlines of the rotor teeth.

18. The electric device according to claim 17, wherein the number of the stator teeth is the same as the number of the rotor teeth;

each of the phase groups comprises a plurality of subsets, the plurality of subsets in the same phase group are spaced apart by the subsets in other phase groups, and each of the subsets comprises at least one stator tooth;

the plurality of subsets in each of the plurality of phase groups comprise at least two stator teeth of the plurality of the stator teeth, and an angle between centerlines of the two adjacent stator teeth in each of the plurality of subsets is the same as an angle between the centerlines of the two adjacent rotor teeth;

the number of the phase groups is three, and an angle between centerlines of the stator teeth of at junctions of every two adjacent phase groups of the three phase groups satisfy formulas shown as follows:

$$P1 = P2 = P0 - P0 \cdot \frac{1}{3}$$

$$P3 = P0 + P0 \cdot \frac{2}{3}$$

wherein P0 represents an angle between the centerlines of the two adjacent rotor teeth, P1 represents an angle between centerlines of the stator teeth at a junction between a first phase group and a second phase group, P2 represents an angle between centerlines of the stator teeth at a junction between the second phase group and a third phase group, and P3 represents an angle between centerlines of the stator teeth at a junction between the third phase group and the first phase group.

* * * * *